(12) United States Patent
Nguyen

(10) Patent No.: US 9,452,511 B2
(45) Date of Patent: Sep. 27, 2016

(54) COMBINATION ER WRENCH

(75) Inventor: Long Khac Nguyen, Rochester, NY (US)

(73) Assignee: Last Tool Factory LLC, Rochester, NY (US)

( * ) Notice: Subject to any disclaimer, the term of this patent is extended or adjusted under 35 U.S.C. 154(b) by 772 days.

(21) Appl. No.: 12/953,543

(22) Filed: Nov. 24, 2010

(65) Prior Publication Data

US 2012/0125162 A1    May 24, 2012

(51) Int. Cl.
| | |
|---|---|
| B25B 13/50 | (2006.01) |
| B25B 13/08 | (2006.01) |
| B25B 13/06 | (2006.01) |
| B23C 9/00 | (2006.01) |
| B25B 13/48 | (2006.01) |
| B23B 31/20 | (2006.01) |
| B25B 13/04 | (2006.01) |

(52) U.S. Cl.
CPC ............. *B25B 13/48* (2013.01); *B23B 31/201* (2013.01); *B25B 13/04* (2013.01); *B25B 13/08* (2013.01); *B25B 13/50* (2013.01); *B23B 2260/078* (2013.01)

(58) Field of Classification Search
CPC ....... B25B 13/02; B25B 13/04; B25B 13/06; B25B 13/065; B25B 13/08; B25B 13/48; B25B 13/485; B25B 13/50; B25B 31/201; B25B 2260/078
USPC .......... 81/176.1–176.3, 119, 58.2; D8/21–29
See application file for complete search history.

(56) References Cited

U.S. PATENT DOCUMENTS

| | | | |
|---|---|---|---|
| 363,331 A | 5/1887 | Hammer | |
| 1,529,075 A * | 3/1925 | McIntyre | B25B 13/04 81/124.3 |
| 1,640,383 A * | 8/1927 | Thomas | B25B 13/04 81/176.15 |
| D104,869 S | 6/1937 | McNaught | |
| 2,196,701 A * | 4/1940 | Homsher | B25B 13/04 408/227 |
| D120,489 S | 5/1940 | Musselman | |
| D130,756 S * | 12/1941 | Howard | B25F 1/00 7/138 |
| D138,790 S | 9/1944 | Czekalski | |
| 2,394,808 A * | 2/1946 | Rohr | B25B 13/107 81/176.1 |
| 2,420,458 A * | 5/1947 | Barker | 81/176.1 |
| 2,671,368 A | 3/1954 | Diebold | |
| 2,830,480 A * | 4/1958 | Brame | 81/176.15 |
| 3,003,379 A | 10/1961 | Pribitzer | |
| 3,354,757 A * | 11/1967 | Grimm et al. | 81/176.1 |
| 3,745,859 A | 7/1973 | Evans et al. | |
| 3,768,345 A * | 10/1973 | Barnes | B25B 13/48 81/176.15 |
| 3,905,255 A | 9/1975 | Evans | |
| 4,440,047 A | 4/1984 | Robbins | |
| 4,488,459 A | 12/1984 | Bailey et al. | |
| D329,788 S * | 9/1992 | Andrew | D8/17 |

(Continued)

*Primary Examiner* — Hadi Shakeri

(74) *Attorney, Agent, or Firm* — Laura W. Smalley; Harris Beach PLLC

(57) ABSTRACT

A combination ER wrench is disclosed for use in installing and tightening collet holders in connection with milling machines or machining centers. The disclosed wrench combines the function of multiple wrenches. The disclosed wrench has two open ends and two box ends that fit various collets and collet holders common in the industry, along with a box end to fit a retention knob. The open ends of the wrench have arcurate jaws and five points to contact the collet and/or collet nut. The box ends of the wrench are openings shaped to contact the collect and/or collet nut.

8 Claims, 3 Drawing Sheets

(56) References Cited

U.S. PATENT DOCUMENTS

| | | |
|---|---|---|
| 5,842,391 A | 12/1998 | Chaconas |
| D422,858 S * | 4/2000 | Moore .............................. D8/17 |
| 6,131,494 A * | 10/2000 | Quenneville ........... B25B 13/48 81/125.1 |
| D467,777 S | 12/2002 | Van Horn et al. |
| 6,705,182 B2 * | 3/2004 | Bennett ........................ 81/176.2 |
| 6,745,648 B2 * | 6/2004 | Stier ........................ B25B 13/48 81/119 |
| 6,779,424 B2 * | 8/2004 | Schmidt .................. B25B 13/48 81/124.2 |
| 6,899,002 B2 | 5/2005 | Willis, Sr. |
| 6,962,100 B2 | 11/2005 | Hsien |
| 7,159,491 B1 | 1/2007 | Chaconas et al. |
| D542,105 S * | 5/2007 | Grether .......................... D8/28 |
| 7,484,440 B2 | 2/2009 | Wright |
| 7,549,953 B2 * | 6/2009 | Walters .......................... 483/65 |
| D601,393 S | 10/2009 | Cui |
| 7,874,034 B1 * | 1/2011 | Mack ...................... B25B 13/02 7/138 |
| 9,272,396 B2 * | 3/2016 | Stricker ................. B25G 1/105 |
| 2001/0022118 A1 * | 9/2001 | Zollmann ............. B23B 31/201 81/176.15 |
| 2001/0054334 A1 | 12/2001 | Ling et al. |
| 2003/0159546 A1 * | 8/2003 | Blair .................. F16B 23/0061 81/119 |
| 2005/0066777 A1 | 3/2005 | Lee |
| 2007/0283789 A1 | 12/2007 | Zeidler |
| 2010/0013171 A1 * | 1/2010 | Haimer .................. B23B 31/20 279/147 |
| 2010/0192344 A1 * | 8/2010 | Zollmann ........... F16B 23/0007 29/256 |

* cited by examiner

COMBINATION ER WRENCH

The invention is directed to a combination wrench for use with milling machines and turning centers. The disclosed ER wrench is used to tighten collet nuts when changing tools in a tool holder. The wrench has five point contacts and two working ends, with each end being open-ended and having a box-end incorporated below the open end of the wrench, thereby providing compatibility with most sizes of commercially-available machine tool holders.

BACKGROUND OF THE INVENTION

Milling and turning machines are both machine tools used to machine, or shape, solid materials. Milling machines and turning machines are often classed in three basic forms: horizontal, vertical and lathe. These machines range in size from small-bench mounted devices to room-size machines. Milling machines and turning machines both move the work piece radially against the rotating milling cutter. Work piece and cutter movement are precisely controlled to less than 0.001 inches (0.025 millimeters). Both milling machines and turning machines may be manually operated, mechanically automated, or digitally automated via computer numerical control (CNC). Both machines can perform a vast number of operations, from simple (diameters, threads, grooves, slot and key weight cutting, planing, drilling) to complex (contouring and diesinking). The purpose of both CNC milling machines and turning machines is to use a set of input specifications describing a physical object to produce a machine part according to the specifications. The part is typically formed from solid block stock material such as metal, and shaped by various machine tools such as drills, mills, lathes, electrostatic discharge machines and gauging systems.

Typical CNC milling machines and turning machines have a machine spindle head with a rotating spindle shaft that handles a plurality of machining tools, including drills, mills and various styles of chip-removing cutters. When a CNC milling machine includes a mechanism for the exchanging of these tools, it is generally referred to as a machining center or CNC machining center. Milling machines, turning machines and machining centers are designed to produce a finished work piece from the raw starting material quickly and precisely. During the actual machining operations, the computer-controlled movements of the milling tools through the work piece are optimized for removing waste material from the work piece. When an exchange of tools is required, the interruption of the machining operation for the tool exchange function is typically so short that little time is added to that of actual machining.

CNC (computer numerical control) machining centers perform the cutting functions that were traditionally performed by manual milling machines. CNC equipment provides increased control and repeatability of the cutting tool. There are three basic machining centers—vertical, horizontal and lathe. The terms horizontal, vertical and lathe refer to the spindle designs of the machining center, which are in the horizontal, vertical or turning center position. A vertical machining center spindle holds the cutting tool in the vertical position and is programmed to cut in three axes—X, Y and Z. Certain of these centers will have an indexer, which can rotate the part being cut along the axis, creating a fourth axis. The vertical machining center spindle holds the cutting tool in a horizontal position and can be programmed to rotate 360° in a circular motion (the B-axis). This machining center therefore positions and cuts in four axes (X, Y, Z and B). The most advanced CNC milling machines, multi-axis machines, add two more axes in addition to the X, Y and Z axes. The B axis, as noted above, controls the tilt of the tool itself. Horizontal milling machines also have a C axis allowing the horizontally-mounted work piece to be rotated, essentially allowing asymmetric and eccentric turning. When all of these axes are used in conjunction with each other, extremely complicated geometries can be made with relative ease with this machine. In a turning center, the spindle holds the part to be machined and the turret holds the cutting tools in the horizontal position, and the center is programmed to cut in two axes—X and Z.

The accessories and cutting tools used on machine tools (including milling machines and turning machines) are referred to in aggregate by the mass noun "tooling." There is a high degree of standardization of the tooling used with CNC milling machines, turning machines and milling centers.

The toolholder, which is assembled off line, is loaded into the machining center's tool magazine for storage. The purpose of the toolholder is to grip and center the tool. CAT tooling, sometimes called V-flange tooling, is the most common type of tooling in the United States. CAT tooling, invented by Caterpillar Inc. to standardize the tooling used on its machinery, comes in a range of sizes designated as CAT-30, CAT-40, CAT-50 etc. The numbers refer to the Association for Manufacturing Technology (formerly the National Machine Tool Builders Association or "NMTB") taper size of the tool.

An improvement on CAT tooling is BT tooling, which has a similar appearance and can be easily confused with CAT tooling. Like CAT tooling, BT tooling comes in a range of sizes and uses the same Association for Manufacturing Technology body taper. BT tooling differs from CAT tooling in that it is symmetrical about the spindle axis, while CAT tooling is not. This gives BT tooling greater stability and balance at high speeds. SK and HSK tooling (hollow shank tooling) are more common in Europe.

CNC machines and turning machines use toolholders that have been precisely ground with a male taper that mates with the machine's specific female taper. The tool holder is secured in place with a retention knob or drawbar thread. On CNC machines, the retention knob is more popular because it allows for easier automatic tool changing.

The most common toolholder designs are the mill end holder and the collet holder. In a collet holder, the collet grips and centers the tool in the tool holder. Collets are often partially slit on the surface, allowing them to flex diametrically when clamping. Collets are available in two basic forms: double angle and single angle.

CNC toolholders, such as collet holders, have a retention knob, a taper shank, the V-flange, the key slots and the gauge line diameter. Collet toolholders also generally have a through hole that allows coolant to reach the cutting edge. The V-flange allows the automatic tool change arm to unload and load the toolholder quickly. The shank size depends on the size of the CNC machine spindle and the cutting tools. As shown in the Drawings, FIG. 1, which depicts a V-flange tool holder 1 with a taper shank 2, the retention knob 3 is inserted in the shank. The body of the shank has a coolant through-hole 4 and a gage line diameter 5. There are two key slots 6 at the base of the shank. The tool holder 1 secures the tool 7 which is held in place by a clamp nut 8.

Wrenches are the typical tools used in securing the toolholder in the machining center and securing the tool in the toolholder. The collet itself grips the tool and holds it in place inside of the toolholder. ER wrenches are used to tighten or loosen the collet (or clamp) nuts. Collet nuts may be hexagonal in shape or slotted. The disclosed ER wrench will fit both types of nuts. The retention knob (or pull stud), which is inserted in the back of the tool holder via a screw mechanism, holds the tool in the machine. The knob will be removed and reattached when tools are changed in the machine. One of the openings on the disclosed ER wrench is to tighten or loosen the retention knob (or pull stud).

A wrench is a tool that provides grip and mechanical advantage in applying torque to turn objects, such as nuts and bolts. Types of wrenches are open-end wrenches and box-ended wrenches. Open-end wrenches are one-piece wrenches with an opening that grips two or more faces of the bolt or nut. In the most common type, U-shaped wrenches, the ends are generally oriented at an angle of approximately 15 degrees to the longitudinal axis of the handle. Box-ended wrenches are one-piece wrenches with enclosed openings that grip the faces of the bolt or nut. The opening in the wrench is generally a six- or twelve-point opening that fits nuts or bolt heads with a hexagonal shape. Eight-point wrenches are also made for square-shaped nuts and bolt heads. A combination wrench is a double-ended tool with one end open like an open-end wrench and the other end enclosed like a box-end wrench.

In the machine tool industry, there are wrenches used to tighten and loosen the nuts used in securing the collet known as collet nut wrenches. Typically, a separate wrench is needed for each size of machine tool. Typical sizes in the industry are ER-8, ER-11, ER-16, ER-20, ER-25, ER-32 and ER-40. In addition, different wrenches are required for collet nuts that have slots and ones that do not (which require hexagonal wrenches). The design of prior art wrenches does not permit using the same wrench with slotted and hexagonal collets, even if they have the same taper size. Further, a separate tool is required to tighten the retention knob. Thus, numerous tools are required in changing the tool holders and tools in a typical CNC machining center.

Further, existing collet nut wrenches, which have four prongs, suffer from various infirmities. The four-point contact tends to result in uneven torque being applied to the sides of the collet and/or collet nut, causing a distortion of the collet nut and possible damage. Further, as noted above, separate four-point wrenches are needed for slotted and hexagonal collet nuts. Further, current wrenches will come loose from the collet and/or collet nut if not supported by, for example, the operator's hand. The invention disclosed below is intended to improve upon current wrenches existing in the prior art.

SUMMARY OF THE INVENTION

It is the object of this invention to provide an improved wrench that is simple to use and easy to manufacture, and which facilitates the installation and tightening of collet holders. It is a further object of this invention to provide a single wrench that can perform the function of numerous prior art wrenches previously required.

A wrench is provided that comprises a handle with a first open end at a first end of the handle. The first open end comprises a first arcurate jaw and a second arcurate jaw, each having a point oriented inward. The first open end also has three points spaced between the ends of the first arcurate jaw and the second arcurate jaw. The wrench may also preferably have a second open end at a second end of the handle. The second open end comprises a first arcurate jaw and a second arcurate jaw, each having a point oriented inward. The second open end also has three points spaced between the ends of the first arcurate jaw and the second arcurate jaw of the second open end.

The wrench disclosed may also preferably comprise a first box end that is a circular opening comprising six points spaced along the circumference of the circle. The wrench may preferably further comprise a second box end that is a hexagonal opening. Finally, the disclosed wrench may also preferably comprise a third box end that is an opening with four sides, two of the sides being curved and two of the sides being straight. In any embodiment of the invention, the handle may have curved serrations. In the disclosed preferred embodiment, the first open end may be sized to fit a NTMB 40 collet, the second open end may be sized to fit a NTMB 25 collet, the first box end may be sized to fit a NTMB 20 collet, and the second box end may be sized to fit a NTMB 11 collet.

Another preferred embodiment of the disclosed wrench comprises a handle with a first open end at a first end of the handle. The first open end has a first arcurate jaw and a second arcurate jaw, each having a point oriented inward. The first open end also has three points spaced between the ends of said first arcurate jaw and said second arcurate jaw. This embodiment of the wrench may also comprise a second open end at a second end of the handle. The second open end has a first arcurate jaw and a second arcurate jaw, each having a point oriented inward. The second open end also has three points spaced between the ends of the first arcurate jaw and the second arcurate jaw of the second open end.

This embodiment of the wrench may also preferably comprise a first box end that is an opening with four sides, two of the sides being curved and two of the sides being straight. The wrench may also preferably comprise a second box end that is a hexagonal opening. In this preferred embodiment, the first open end may be sized to fit a NTMB 32 collet, the second open end may be sized to fit a NTMB 16 collet, and the second box end may be sized to fit a NTMB 11 collet.

DETAILED DESCRIPTION OF THE INVENTION

The present invention relates to a combination ER wrench for use in tightening and/or removing collet nuts and tightening and/or loosening the retention knob when changing or adjusting the tools in a tool holder. The disclosed wrench has an open end at both ends of the handle. Further, each end of the handle preferably has a box-end incorporated directly below the open end (with the reference line running from the end of the wrench towards the center of the wrench). The wrench is unitarily-formed—i.e., of one piece metal construction, preferably made of alloy steel. One side of the wrench has curved serrations formed along one edge to assist in gripping the tool. Each open end has left and right arcurate jaws. Each of the jaws has a front tooth or point oriented inward approximately 45 degrees from the end of the jaw. There are three evenly-spaced teeth or points between the two ends of the jaws. The five points of the open-end of the wrench contact five of the six sides of the collet (in the case of a hexagonal shaped collet) or five of the six slots of the collet (in the case of a slotted collect) and allow the user to tighten the nut without distortion or damage to the collet nut or collet. In one embodiment of the disclosed wrench, one of the open ends of the wrench is sized to fit a collet with an Association for Manufacturing Technology (formerly the National Machine Tool Builders Association or "NMTB") size NMTB 40 taper. The other open end of the wrench is sized to fit a collet with a NMTB 25 taper.

As noted above, each end of the wrench preferably has a box-end located below the open end of the wrench. In the embodiment of the wrench described above, one box-end has a circular opening with six evenly-spaced teeth or points and is sized to fit a collet with a size NMTB 20 taper. The other box-end has a hexagonal opening sized to fit a collet with a size NMTB 11 taper. Further, preferably this embodiment of the wrench has an opening with two straight sides and two outwardly-curving sides that fit the standard retention knob. This additional opening is preferably located below the box-end sized to fit the NMTB 20 taper.

In another embodiment of the disclosed wrench, one of the open ends of the wrench is sized to fit a collet with a size NMTB 32 taper. The other open end of the wrench is sized to fit a collet with a NMTB 16 taper. In this embodiment, each end of the wrench preferably has a box-end located below the open end of the wrench. The box-end located near the open end sized to fit a NMTB 32 taper has two straight sides and two outwardly-curving sides and fits the standard retention knob. The other box end has a hexagonal opening sized to fit a collet with a size NMTB 11 taper.

Figure 1:
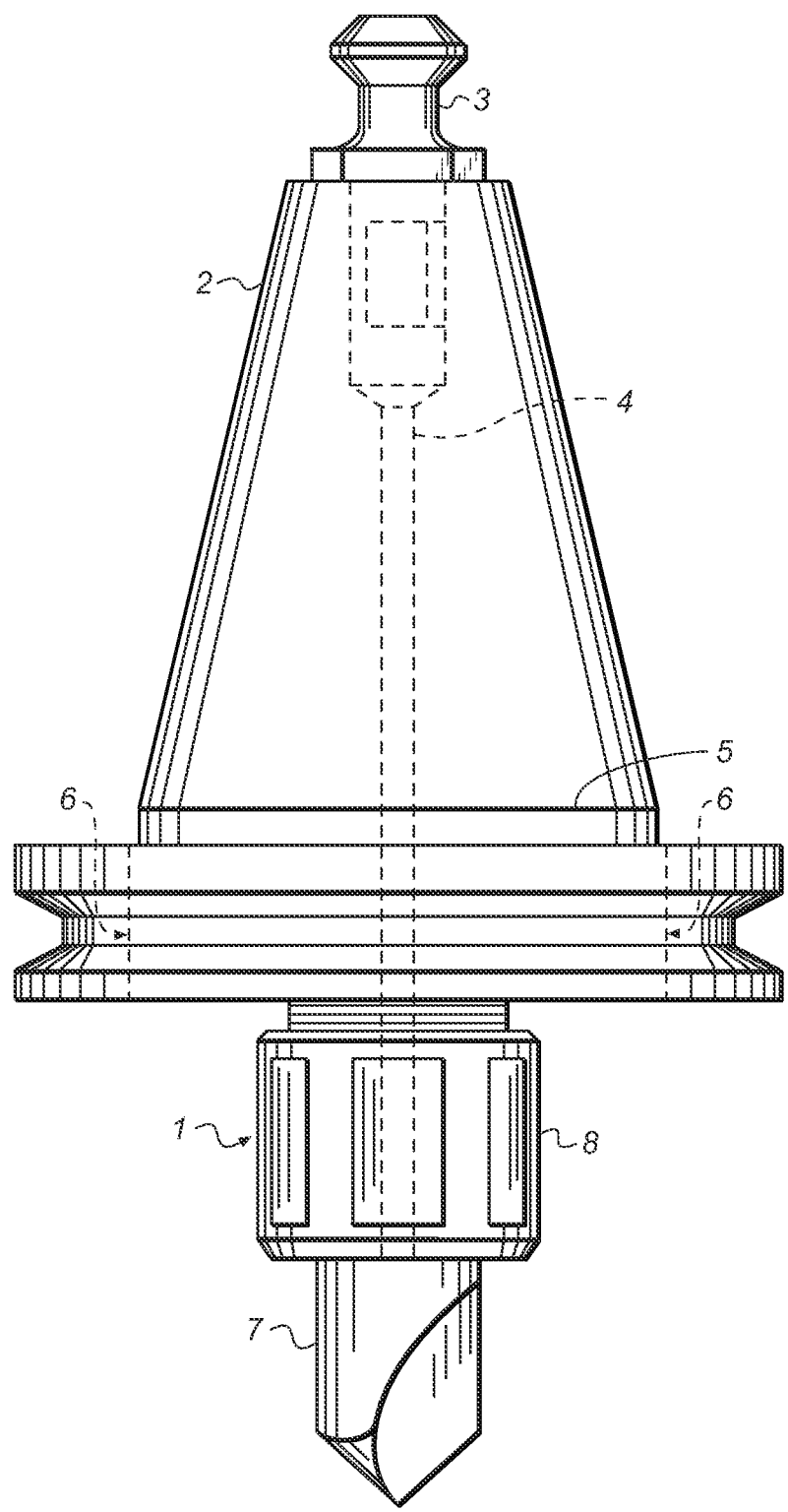
FIG. 1 is a side view of a typical V-flange collet holder.
Figure 2:
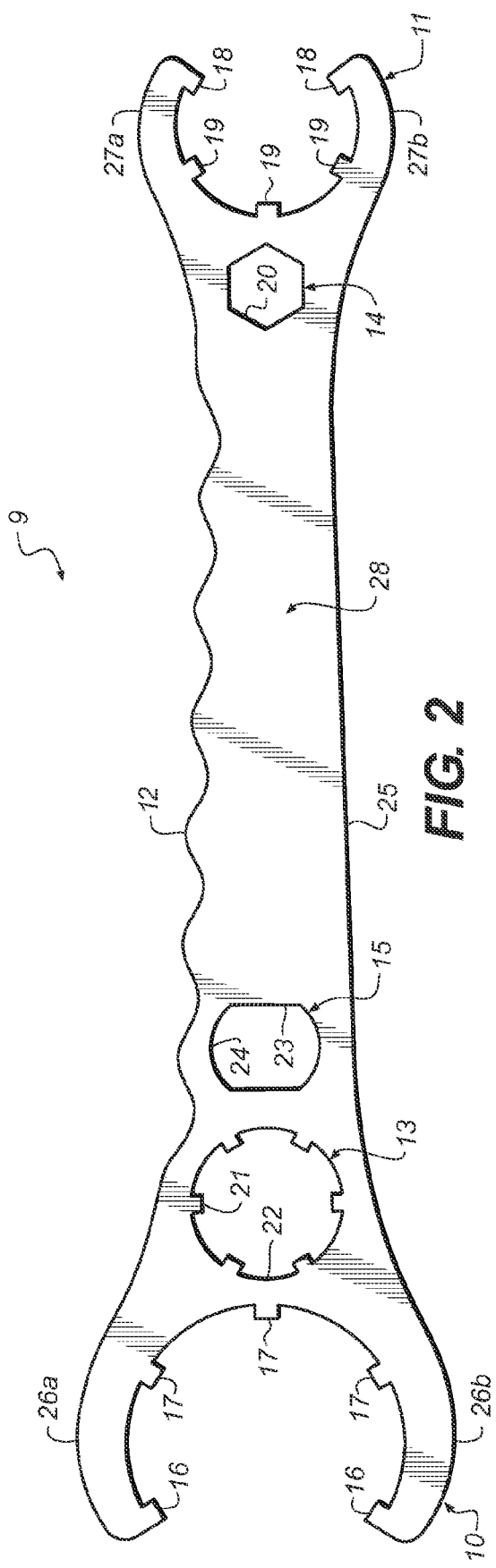
FIG. 2 is a top plan view of an ER wrench according to one embodiment of this invention.

With respect to the Drawings, FIG. 2 illustrates one of the preferred embodiments of the invention. The dual-headed wrench 9 has a first open end 10 and a second open end 11, one at each end of the handle 28. The wrench also has a first box-end 13 and a second box end 14, located below the first and second open ends. The handle 28 has a smooth side 25 and a side with curved serrations 12. The first open end 10 has left and right arcurate jaws 26a and 26b. Each end of the jaws has a front tooth or point 16 oriented inward approximately 45 degrees from the end of the jaw. Between the ends of the jaws, there are three evenly-spaced teeth or points 17. The first box end 13, located proximate the first open end 10, is circular in shape with six equally-spaced points or teeth 21 separated by portions of the circular opening 22. Proximate the first box end 13 is located the third box end 15 which is an opening with two straight sides 23 and two curved sides 24.

The second open end 11 of the wrench 9 has left and right arcurate jaws 27a and 27b. Each end of the jaws has a front tooth or point 18 oriented inward approximately 45 degrees from the end of the jaw. Between the ends of the jaws, there are three evenly-spaced teeth or points 19. The second box end 14, located proximate the second open end 11, is hexagonal in shape with six sides 20 of equal length.

Figure 3:
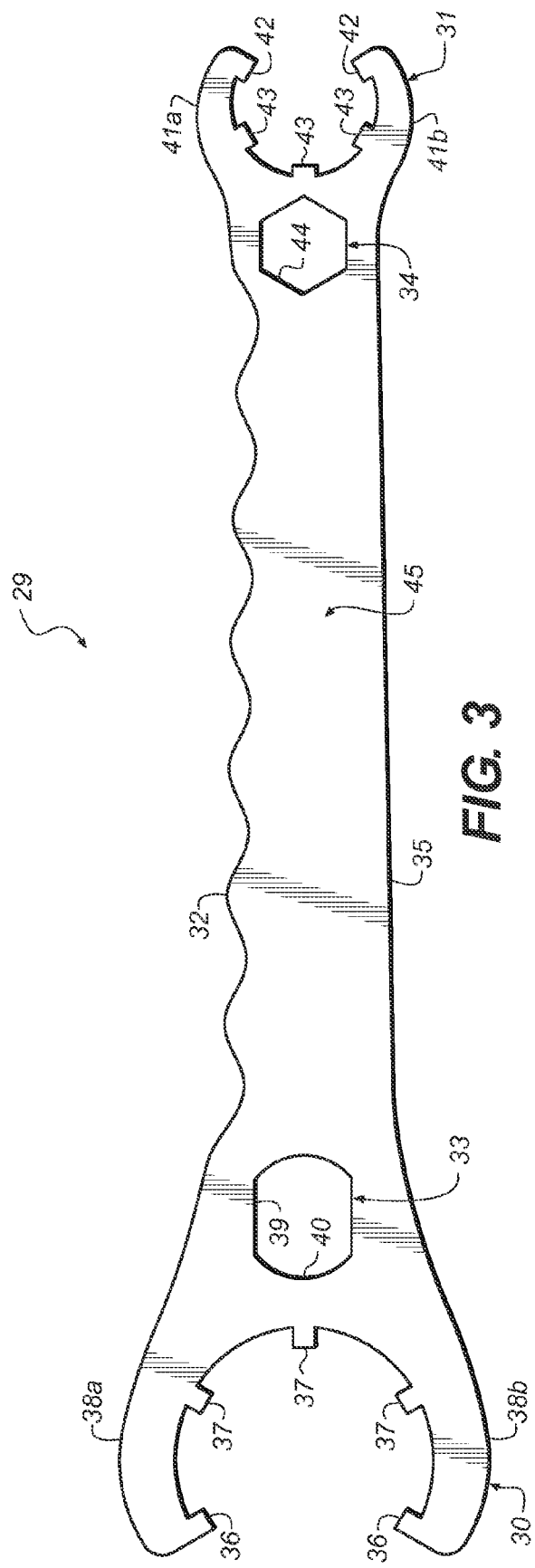
FIG. 3 is a top plan view of an ER wrench according to another embodiment of this invention.

With respect to the Drawings, FIG. 3 illustrates another of the preferred embodiments of the invention. The dual-headed wrench 29 has a first open end 30 and a second open end 31, one at each end of the handle 45. Each end of the wrench also has a first box-end 33 and a second box end 34. The handle 45 has a smooth side 35 and a side with curved serrations 32. The first open end 30 has left and right arcurate jaws 38a and 38b. Each end of the jaws has a front tooth or point 36 oriented inward approximately 45 degrees from the end of the jaw. Between the ends of the jaws, there are three evenly-spaced teeth or points 37. The first box end 33, located proximate the first open end 30, is an opening with two straight sides 39 and two curved sides 40.

The second open end 31 of the wrench 29 has left and right arcurate jaws 41a and 41b. Each end of the jaws has a front tooth or point 42 oriented inward approximately 45 degrees from the end of the jaw. Between the ends of the jaws, there are three evenly-spaced teeth or points 43. The second box end 34, located proximate the second open end 31, is hexagonal in shape with six sides 44 of equal length.

What is claimed is:

1. A double-headed ER wrench for tightening or loosening a machine tool collet nut comprising:
    a wrench handle of a double-headed ER wrench;
    a first open end disposed at a first end of said handle comprising:
        a first open end left arcuate jaw having a first open end first tooth at a distal end of said first open end left arcuate jaw, said first open end first tooth oriented inward towards the handle at about 45 degrees;
        a first open end right arcuate jaw having a first open end fifth tooth at a distal end of said first open end right arcuate jaw, said first open end fifth tooth oriented inward towards the handle at about 45 degrees;
        three first open end teeth equally spaced between said first open end first tooth and said first open end fifth tooth, a first open end middle tooth of said three first open end teeth co-linear with a long axis of said double-headed ER wrench handle, a width of each tooth being shorter than a first open end distance between adjacent teeth, said first open end distance between adjacent teeth sized to fit a first size machine tool slotted collet nut, said first open end first tooth and said first open end fifth tooth equidistant from said first open end middle tooth;
    a second open end disposed at a second end of said handle comprising:
        a second open end left arcuate jaw having a second open end first tooth at a distal end of said second open end left arcuate jaw, said second open end first tooth oriented inward towards the handle at about 45 degrees;
        a second open end right arcuate jaw having a second open end fifth tooth at a distal end of said second open end right arcuate jaw, said second open end fifth tooth oriented inward towards the handle at about 45 degrees;
        three second open end teeth equally spaced between second open end first tooth and said second open end fifth tooth, a second open end middle tooth of said three second open end teeth co-linear with said long axis of said double-headed ER wrench handle, a width of each tooth being shorter than a second open end distance between adjacent teeth, said second open end distance between adjacent teeth sized to fit a second size machine tool slotted collet nut, said second open end first tooth and said second open end fifth tooth equidistant from said second open end middle tooth;
    a box wrench disposed in said handle between said first open end and said second open end and having an opening with two straight sides and two curved sides, said box wrench, sized to tighten or loosen a machine tool retention knob or a pull stud;
    wherein each of said first open end and said second open end are sized to contact 5 slots of 6 slots of a machine tool slotted collet nut; and
    wherein when said first open end or said second open end is engaged to tighten or loosen a machine tool collet nut, an opposite end of said first open end or said second open end provides a hand hold to support said double-ended ER wrench during the tightening or loosening of the machine tool collet nut.

2. The double-headed ER wrench according to claim 1, wherein said handle comprises curved serrations.

3. The double-headed ER wrench according to claim 1, wherein at least one of said first open end or said second open end is sized to fit a NTMB collet selected from the group consisting of a NTMB 20 collet, a NTMB 25 collet, a NTMB 32 collet, and a NTMB 40 collet.

4. The double-headed ER wrench according to claim 1, where said double-headed ER wrench provides an equivalent of two ER wrenches selected from the group consisting of an ER-40 wrench, an ER-32 wrench, an ER-25 wrench, an ER-20 wrench, an ER-16 wrench, and an ER-11 wrench.

5. The double-headed ER wrench according to claim 1, further comprising at least one additional box wrench disposed in said handle.

6. The double-headed ER wrench according to claim 5, where said at least one additional box wrench disposed in said handle comprises a hexagonal opening.

7. The double-headed ER wrench according to claim 5, where said at least one additional box wrench disposed in said handle comprises a circular opening comprising 6 points spaced along the circumference of the circle.

8. The double-headed ER wrench according to claim 5, wherein said at least one additional box wrench disposed in said handle provides an equivalent of an ER wrench selected from the group consisting of an ER-40 wrench, an ER-32 wrench, an ER-25 wrench, an ER-20 wrench, an ER-16 wrench, and an ER-11 wrench.

* * * * *